United States Patent
Kahn et al.

(10) Patent No.: US 8,312,540 B1
(45) Date of Patent: Nov. 13, 2012

(54) SYSTEM FOR SLOWING PASSWORD ATTACKS

(75) Inventors: Clifford E. Kahn, Westford, MA (US); Jeffrey C. Venable, Sr., Union City, CA (US); Roger A. Chickering, Granite Bay, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 919 days.

(21) Appl. No.: 12/198,674

(22) Filed: Aug. 26, 2008

Related U.S. Application Data

(60) Provisional application No. 61/061,349, filed on Jun. 13, 2008.

(51) Int. Cl.
  G06F 11/30 (2006.01)
  G06F 12/14 (2006.01)
  G06F 21/00 (2006.01)
  G08B 23/00 (2006.01)
  H04L 9/32 (2006.01)

(52) U.S. Cl. .................... 726/22; 726/6; 726/7; 726/25; 713/183

(58) Field of Classification Search .................. 726/2–7, 726/16, 17, 21, 22, 23, 25; 713/155, 182, 713/183
  See application file for complete search history.

(56) References Cited

U.S. PATENT DOCUMENTS

| | | | |
|---|---|---|---|
| 5,266,942 A * | 11/1993 | Stoller | 340/5.74 |
| 5,559,505 A * | 9/1996 | McNair | 340/5.28 |
| 6,681,331 B1 | 1/2004 | Munson et al. | |
| 6,829,356 B1 * | 12/2004 | Ford | 380/44 |
| 6,907,430 B2 | 6/2005 | Chong et al. | |
| 6,963,983 B2 | 11/2005 | Munson et al. | |
| 7,028,338 B1 * | 4/2006 | Norris et al. | 726/23 |
| 7,065,657 B1 * | 6/2006 | Moran | 726/5 |
| 7,161,468 B2 * | 1/2007 | Hwang et al. | 340/5.82 |
| 7,373,516 B2 * | 5/2008 | Ashok et al. | 713/183 |
| 7,383,570 B2 * | 6/2008 | Pinkas et al. | 726/2 |
| 7,591,004 B2 * | 9/2009 | Roskind | 726/2 |
| 7,818,788 B2 * | 10/2010 | Meier | 726/4 |
| 7,849,213 B1 * | 12/2010 | Borghetti | 709/238 |
| 8,132,018 B2 * | 3/2012 | Eldar et al. | 713/183 |
| 2001/0055388 A1 * | 12/2001 | Kaliski, Jr. | 380/30 |
| 2004/0064742 A1 * | 4/2004 | Excoffier et al. | 713/202 |
| 2005/0015624 A1 * | 1/2005 | Ginter et al. | 713/201 |
| 2006/0069912 A1 * | 3/2006 | Zheng et al. | 713/151 |
| 2007/0005985 A1 * | 1/2007 | Eldar et al. | 713/183 |
| 2007/0074169 A1 * | 3/2007 | Chess et al. | 717/126 |
| 2008/0034092 A1 * | 2/2008 | Kikuchi et al. | 709/225 |
| 2008/0046989 A1 * | 2/2008 | Wahl | 726/7 |
| 2008/0222706 A1 * | 9/2008 | Renaud et al. | 726/4 |

* cited by examiner

Primary Examiner — Zachary A Davis
(74) Attorney, Agent, or Firm — Shumaker & Sieffert, P.A.

(57) ABSTRACT

In general, the invention is directed toward techniques for controlling access to a network or other computing resource in order to slow down the execution of a password attack while providing minimal obstruction to normal network activity. The method includes generating a history of successful network logins, detecting symptoms of a network password attack, and activating countermeasures in response to the detection. The method further includes receiving a valid login request from the user while the countermeasures are activated and analyzing the history of successful network logins to determine whether the valid login request satisfies a match condition. The method further includes granting the user access to the network when the valid login request satisfies the match condition and denying the user access to the network when the valid login request does not satisfy the match condition even though the valid login request contains a valid username and a valid password.

50 Claims, 6 Drawing Sheets

SYSTEM FOR SLOWING PASSWORD ATTACKS

This application claims the benefit of U.S. Provisional Application No. 61/061,349, filed Jun. 13, 2008, the entire content of which is incorporated herein by reference.

TECHNICAL FIELD

The invention relates to computer security and, in particular, to password-based user authentication.

BACKGROUND

Generally, entities such as enterprises and other organizations implement password-based user authentication to control access to computing resources and networks. Commonly the authenticating information includes a username and user-entered password. One drawback of using usernames and passwords as an authentication method is that passwords tend to be easy for a computer program to guess. Several password-guessing algorithms already exist that can decipher a password when they are given sufficient time and resources. Example password guessing algorithms include Dictionary Attacks, Hybrid Dictionary Attacks, and Brute Force Attacks. Although a broad lockout may stall or stop a password attack, such an approach also prevents legitimate users from logging onto the network. Thus, an attacker could easily mount a denial-of-service attack by repeatedly presenting invalid username-password combinations in order to trigger a broad lockout of the network.

SUMMARY

In general, the invention is directed toward modified lockout techniques for controlling access to a network or other computing resource in order to slow down or prevent the execution of a password attack while providing minimal obstruction to normal activity within the network or other computing resource. The modified lockout techniques in this disclosure may be used for controlling access to networks, web servers, application servers, ATMs, and other computing resources. When the modified lockout techniques described herein are used for controlling access to a network, the techniques may be implemented as a countermeasure within a network access control device of a network system. The countermeasure may be activated after symptoms of a network password attack have been detected by an intrusion detection system.

During normal operation (i.e. when no password attack is occurring), the network access control device may develop a log or history of network logins in order to "learn" typical network access behavior within the network. The network access control device may also generate profiles for various users, locations, and enterprises within the network. These profiles may contain parameters, statistical expressions, and other login information that is indicative of typical or "usual" network access behavior for various users, locations, and enterprises within the network. After the intrusion detection system detects the presence of a password attack within the network, the network access control device may evaluate subsequent login requests based on the history of network logins to determine whether to grant or deny access for the individual login requests. The network access controller may use the profiles of usual behavior to assist in the evaluation of whether to deny or grant access for the subsequent login requests.

In one embodiment, the invention is directed to a method for controlling access to a network. The method includes generating a history of successful network logins. The method further includes detecting symptoms of a network password attack. The method further includes activating countermeasures in response to detecting the symptoms of the network password attack. The method further includes receiving a valid login request from a user while the countermeasures are activated. The valid login request includes a valid username and a valid password corresponding to the valid username. The method further includes analyzing the history of successful network logins to determine whether the valid login request satisfies a match condition. The method further includes granting the user access to the network when the valid login request satisfies the match condition while the countermeasures are activated. The method further includes denying the user access to the network when the valid login request does not satisfy the match condition, while the countermeasures are activated, even though the valid login request contains a valid username and a valid password.

In another embodiment, the invention is directed to a device that controls access to a network. The device includes a network interface for connection to a computer network. The device further includes one or more processors for execution of software instructions. The device further includes a login capture module executing on the one or more processors. The login capture module is configured to generate a history of successful network logins. The device further includes an attack detection module executing on the one or more processors. The attack detection module is configured to detect symptoms of a network password attack and to activate countermeasures in response to detecting the symptoms of the network password attack. The device further includes an access control module executing on the one or more processors. The access control module is configured to receive a valid login request from a user via the network interface while the countermeasures are activated. The valid login request comprises a valid username and a valid password corresponding to the valid username. The device further includes a decision engine executing on the one or more processors. The decision engine is configured to analyze the history of successful network logins to determine whether the valid login request satisfies a match condition. The access control module is further configured to grant the user access to the network, while the countermeasures are activated, when the valid login request satisfies the match condition. The access control module is further configured to deny the user access to the network, while the countermeasures are activated, when the valid login request does not satisfy the match condition even though the valid login request contains a valid username and a valid password.

In another embodiment, the invention is directed to a system. The system includes an endpoint device associated with a user and with which the user interacts to access a network. The system further includes a network access controller coupled to the network. The network access controller includes one or more processors for execution of software instructions. The network access controller further includes a login capture module executing on the one or more processors. The login capture module is configured to generate a history of successful network logins. The network access controller further includes an attack detection module executing on the one or more processors. The attack detection module is configured to detect symptoms of a network password attack and to activate countermeasures in response to detecting the symptoms of the network password attack. The network access controller further includes an access control module executing on the one or more processors. The access control module is configured to receive a valid login request from a user while the countermeasures are activated. The valid login request comprises a valid username and a valid password corresponding to the valid username. The network access controller further includes a decision engine executing on the one or more processors. The decision engine is configured to analyze the history of successful network logins to determine whether the valid login request satisfies a match condition. The access control module is further configured to grant the user access to the network, while the countermeasures are activated, when the valid login request satisfies the match condition. The access control module is further configured to deny the user access to the network, while the countermeasures are activated, when the valid login request does not satisfy the match condition even though the valid login request contains a valid username and a valid password.

In another embodiment, the invention is directed to a computer-readable medium containing instructions. The instructions cause a programmable processor to generate a history of successful network logins. The instructions also cause the programmable processor to detect symptoms of a network password attack. The instructions also cause the programmable processor to activate countermeasures in response to detecting the symptoms of the network password attack. The instructions also cause the programmable processor to receive a valid login request from a user while the countermeasures are activated. The valid login request includes a valid username and a valid password corresponding to the valid username. The instructions also cause the programmable processor to analyze the history of successful network logins to determine whether the valid login request satisfies a match condition. The instructions also cause the programmable processor to grant the user access to the network when the valid login request satisfies the match condition while the countermeasures are activated. The instructions also cause the programmable processor to deny the user access to the network when the valid login request does not satisfy the match condition, while the countermeasures are activated, even though the valid login request contains a valid username and a valid password.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
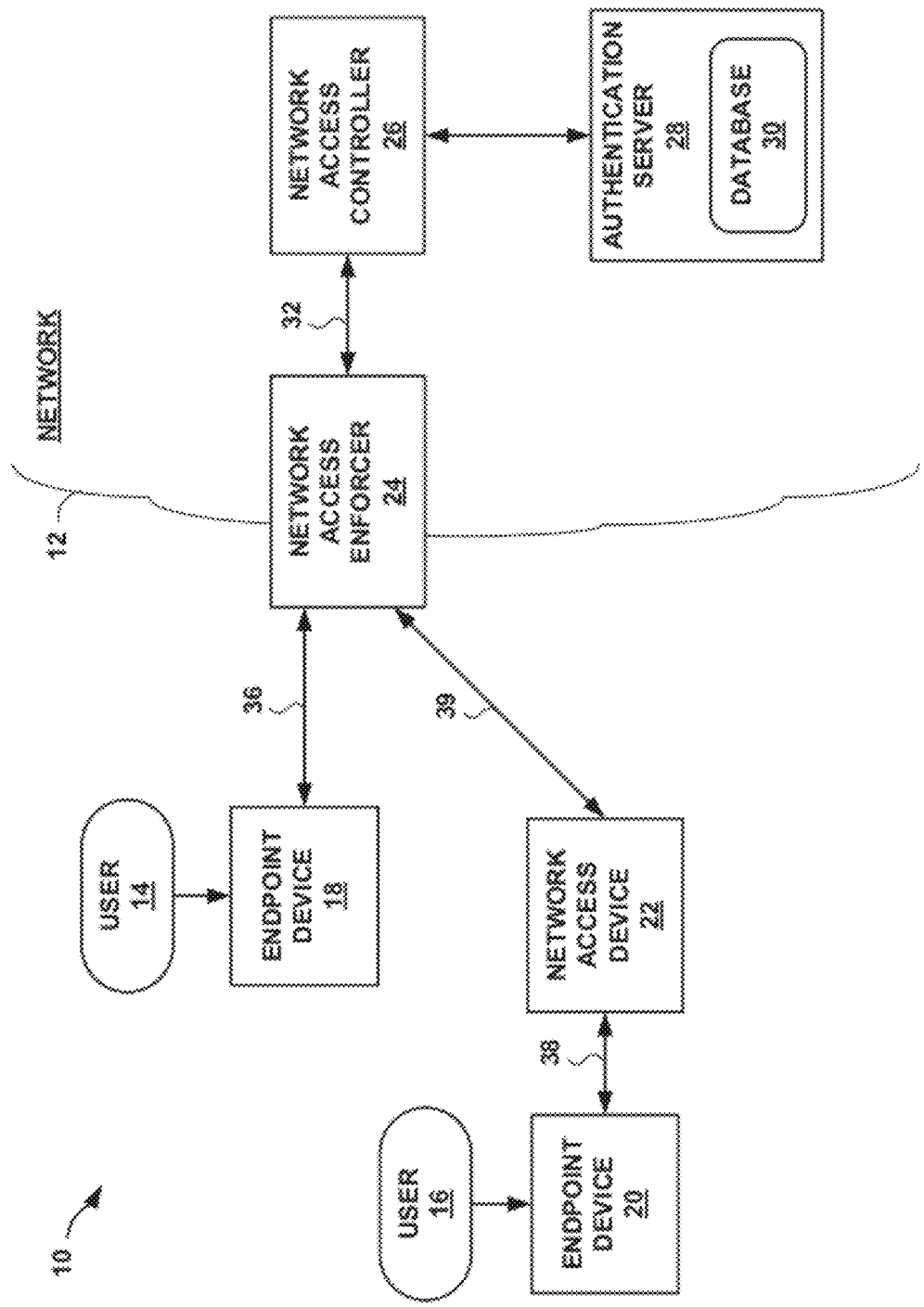
FIG. 1 is a block diagram illustrating an exemplary network system that implements network access control according to the techniques described in this disclosure.

FIG. 1 is a block diagram illustrating an exemplary network system 10 that implements network access control according to the modified lockout techniques described in this disclosure. Network system 10, as shown in FIG. 1, includes a network 12, users 14, 16, endpoint devices 18, 20 and network access device 22. Network 12 may be an enterprise network, private network, or any other network for which controlled network access is desired. Commonly, network 12 comprises an enterprise network or, in other words, a network that an enterprise owns and operates to facilitate intra-enterprise communications.

Users 14, 16 include persons, software programs, and/or machines that wish to obtain access to network 12. Users 14, 16 interact with endpoint devices 18, 20 respectively in order to gain access to network 12. In cases where a user is a software program or a machine, the user may issue automated login requests to endpoint devices 18, 20. Endpoint devices 18, 20 may comprise a laptop computer, a desktop computer, a workstation, a personal digital assistant (PDA), a cellular phone, an Internet Protocol (IP) phone (e.g., a phone capable of communicating via a Voice over IP (VoIP) protocol), or any other device capable of accessing network 12. Devices 18, 20 are referred to herein as an "endpoint devices" because devices 18, 20 represent endpoints with which a user directly interacts.

Endpoint devices 18, 20 each provide an execution environment for one or more software applications (e.g., a web browser) with which a user interacts to access resources within network 12. The web browser may comprise any set of executable software instructions capable of accepting, interpreting, and presenting a graphical display based on hypertext transfer protocol (HTTP) messages, as well as possibly a variety of other protocol messages. Example web browsers include a Microsoft Internet Explorer™ web browser, a Netscape™ web browser, an Opera™ web browser, a Firefox™ web browser, and a Safari™ web browser. Although described herein with reference to a web browser, endpoint devices 18, 20 may access network 12 via other applications and/or hardware, such as by way of a telnet terminal, a file transfer protocol (FTP) program, an electronic mail (e-mail) application, and a terminal emulator (e.g., secureCRT). In addition, endpoint devices 18, 20 may have installed one or more software agents that determine whether the endpoint is in compliance with the enterprise security policies, which may be determined by an administrator and/or downloaded from network 12.

Network 12 may comprise any type of network capable of transmitting data, such as a layer three (L3) packet-switched network (e.g., the Internet) operating over one or more layer two (L2) networks (e.g., an Ethernet or multi-packet label switching (MPLS) network). Reference to layers in this disclosure should be construed as reference to layers of the Open Systems Interconnection (OSI) reference model, or OSI model for short.

Network 12 includes network access enforcer 24, network access controller 26, and authentication server 28. Because an enterprise maintains network 12 to facilitate intra-enterprise communications, some of which may be sensitive or confidential, network 12 may deploy a network access enforcer 24 to control access to network 12 by remote devices located external to network 12, such as endpoint devices 18 and 20.

Network access enforcer 24 may control access to network 12 by denying endpoint devices 18, 20 access to network 12 unless and until endpoint devices 18, 20 are properly authenticated by network access controller 26 operating in conjunction with authentication server 28.

Network access enforcer 24 may, for example, comprise a L2 switch, a firewall, or any other device capable of allowing or preventing network access by endpoint devices 18, 20. Generally, network access enforcer 24 may represent any L2 access device or a system of L2 access devices, such as a plurality of switches or wireless access points. Network access enforcer 24 and network access controller 26 may be configured to support a plurality of different data link layer (layer two (L2)) networks, which may be physically independent L2 networks, or may be logically independent virtual local area networks (VLANs). In any case, network access enforcer 24 receives messages from network access controller 26 and assigns endpoint devices 10 to specific L2 networks. Moreover, network access enforcer 24 may be configured to enforce authentication policies determined by network access controller 26. Network access enforcer 24 may receive the policies from network access controller 26 via link 32. Link 32 may generally represent a secure local area network (LAN) associated with an enterprise. In some embodiments, link 32 may comprise a secure connection such as a Secure Sockets Layer (SSL) connection, an Internet Protocol Security (IPSec) connection, or any other secured connection.

Network access controller 26 operates as a control agent and policy server, and is configured to control access to network 12 according to the modified lockout techniques described herein. Each of endpoint devices 18, 20 may initially negotiate with network access controller 26 for authentication, authorization and connection to network 12, and may be specifically assigned to one of the L2 networks. To do so, endpoint devices 18, 20 may negotiate with network access controller 26 through network access enforcer 24. In this manner, network access enforcer 24 acts as a proxy between endpoint devices 18, 20 and network access controller 26. For example, network access enforcer 24 forwards to network access controller 26 any network access requests received from endpoint devices 18, 20 or network access device 22. The network access request may include a network login request comprising authenticating information in the form of a username and corresponding password.

In response, network access controller 26 accesses authentication server 28 for validation of the authenticating information. Network access controller 26 receives responses from authentication server 28 indicating whether a security credential contained within the authentication request is valid. The authentication request may include a user identification as well as a security credential. For example, the authentication request may include a username and password combination. The password may be a hash code or a ciphertext representation of an actual password entered by the user into the endpoint devices. Authentication server 28 may be a Remote Access Dial in User Service (RADIUS) server that operates according to a RADIUS protocol, a Lightweight Directory Access Protocol (LDAP) server that operates according to an LDAP protocol, or any other authentication server capable of authenticating username-password combinations.

Based upon the results received from authentication server 28 and upon any countermeasures that may be activated, such as the modified lockout techniques described herein, network access controller 26 grants particular users and/or endpoints access to network 12 and denies other users and/or endpoints access to network 12. Network access controller 26 may grant or deny access to network 12 at least in part by sending configuration information to network access enforcer 24. The configuration information may include policies and/or access tables that indicate which users and/or endpoint devices are allowed to access the network 12. As one example, network access controller 26 may provide a policy instructing network access enforcer 24 to assign endpoint device 18 to a specific VLAN supported by private network 12. As another example, network access enforcer 24 may permit or reject access requests to network 12 based upon user and/or endpoint device entries contained within the authentication tables received from network access controller 26. In some embodiments, network access enforcer 24 may be integrated into a single network access controller placed at the boundary of the network. In such embodiments, the network access controller may receive network access requests and enforce network access based on internal policies and authentication algorithms.

Authentication server 28 may include database 30 for storing authentication information, i.e., information and data necessary for servicing authentication requests from network access controller 26. Database 30 may be integrated with or into authentication server 28 such that authentication server 28 includes database 30 locally, as shown in FIG. 1, or may reside externally to authentication server 28 and be coupled to authentication server 28. Whether separate or integrated, database 30 may store a plurality of usernames and associated passwords for authorized users of the network. Database 30 may comprise a flat file database, a structured query language (SQL) database, a Kerberos database, a lightweight directory access protocol (LDAP) database, or an Active Directory database.

Authentication server 28 may be configured to determine whether a security credential contained in an authentication is request is valid for the user identified in the authentication request. Authentication server 28 may check database 30 to determine whether the security credential is valid. Database 30 may contain username-password combinations for all or a subset of the users authorized to gain access to network 12. Authentication server 28 may check database 30 to determine if the database contains a username-password combination that matches the username and password submitted with the authentication request. Authentication server 28 may then send a message to network access controller 26 indicating whether the authentication request contains a valid security credential. An authentication request contains a valid security credential when a username-password combination exists in database 30 that matches the username-password combination contained within the authentication request. In some embodiments, the functionality of authentication server 28 may be implemented within network access controller 26.

Endpoint device 18 is configured to submit network access requests to network 12 via link 36. The network access request may contain user identity information as well as a security credential. In some embodiments the network access request may comprise a username and a password. As shown in FIG. 1, endpoint device 18 may submit the network access request to network access enforcer 24, which in turn may forward the network access request to network access controller 26. Endpoint device 18 may transmit network access requests to network 12 via link 36 in accordance with one or more communication protocols such as, for example, the Extensible Authentication Protocol (EAP) or the Hypertext Transfer Protocol (HTTP).

Network access device 22 may be a wired switch or a wireless access point. As one example, network access device 22 may comprise an Institute of Electrical and Electronics Engineers (IEEE) 802.1X compliant network access device. In such an embodiment, endpoint device 20 may be configured to submit network access requests to network access device 22 in accordance with an IEEE 802.1X protocol. Network access device 22 may be configured to receive the network access request via link 38, and transmit a subsequent network access request to network 12 via link 39 in accordance with a Remote Authentication Dial In User Service (RADIUS) network authentication protocol. Network access enforcer 24 may in turn forward the received RADIUS network access request to network access controller 26 for processing. Endpoint device 20 may comprise an access client configured to operate with network access device 22. For example, endpoint device 20 may include an Odyssey Access Client provided by Juniper® networks.

Although FIG. 1 depicts a network system 10 having a first user and endpoint device connected to network 12 via a network access device and a second user and endpoint device connected directly to network 12 without the use of a network access device, it should be understood that network system 10 could have any number of users and endpoint devices arranged in various configurations. In addition, there may be any number of intermediary devices between the endpoint devices and network 12.

Initially, user 14 may interact with the endpoint device 18 to access network 12. Endpoint device 18 may transmit network access requests to network 12 in order to gain access. Network access enforcer 24 may intercept the attempts by endpoint device 18 to access network 12 and determine whether endpoint device 18 was previously authenticated, e.g., granted permission to access network 12. Assuming endpoint device 18 was not previously authenticated, network access enforcer 24 may request that endpoint device 18 provide authenticating information by which network access enforcer 24 can authenticate endpoint device 18 and user 14. Network access enforcer 24 may present this request by directing endpoint device 18 to a dedicated web page provided by network access enforcer 24. In embodiments where endpoint device 18 contains a software agent, the software agent may automatically request authenticating information based on policies downloaded from network 12.

User 14 subsequently enters a password into the web browser or software agent. The password may be entered in conjunction with other authenticating information. For example, the user may enter a token value or other information used for authentication. Upon entering the password into the web browser, user 14 may select a button presented by the web browser to transmit authenticating information to network access enforcer 24 via link 36.

Network access enforcer 24 receives authenticating information from endpoint device 18 and forwards the authenticating information to network access controller 26. Network access controller 26 may send an authentication request to authentication server 28 to determine if the username and password are valid for the endpoint device. Authentication server 28 may respond with a message indicating whether the password is valid for the user. Authentication server 28 may access passwords in database 30 by using as a key any of an IP address of endpoint device 18, a username entered by user 14, or other identifying value or identifier related to either endpoint device 18 or user 14.

Authentication server 28 may compare the received username-password combination with the authentication information stored in database 30. If a matching username-password combination is found within database 30, authentication server 28 may transmit a success message to network access controller 26. If no matching username-password combination is found within database 30, authentication server 30 may transmit a failure message to network access controller 26.

In response to a failure message, network access controller 26 may deny endpoint device 18 or user 14 access to network 12. In response to a success message, network access controller 26 may grant or deny endpoint device 18 or user 14 access to network 12 according to the techniques described herein. More specifically, if no countermeasures are activated in the network, network access controller 26 may unconditionally grant endpoint device 18 or user 14 access to network 12. If countermeasures are activated for the network, network access controller 26 may implement one of the modified lockout techniques described in this disclosure to determine whether to grant or deny endpoint device 18 access to network 12.

As part of the modified lockout techniques, network access controller 26 may analyze a history of network logins to determine if the login request satisfies a match condition. In some embodiments, network access controller 26 may analyze the network logins by generating one or more profiles for various users, locations, or enterprises in the network. The profiles may contain one or more parameters that indicate normal or usual activity for the particular user, location, or enterprise that corresponds to the profile. In such embodiments, the login request may satisfy the match condition when one or more characteristics of the login request fall within a confidence interval for one or more corresponding parameters in the profiles. If the network login request satisfies the match condition, network access controller 26 may grant user 14 or endpoint device 18 access to network 12. On the contrary, if the network login request does not satisfy the match condition, network access controller 26 may deny user 14 and endpoint device 18 access to network 12. In this manner, network access controller 26 provides a high security countermeasure that effectively slows down or prevents the execution of a password attack while providing minimal obstruction to normal network activity.

Figure 2:
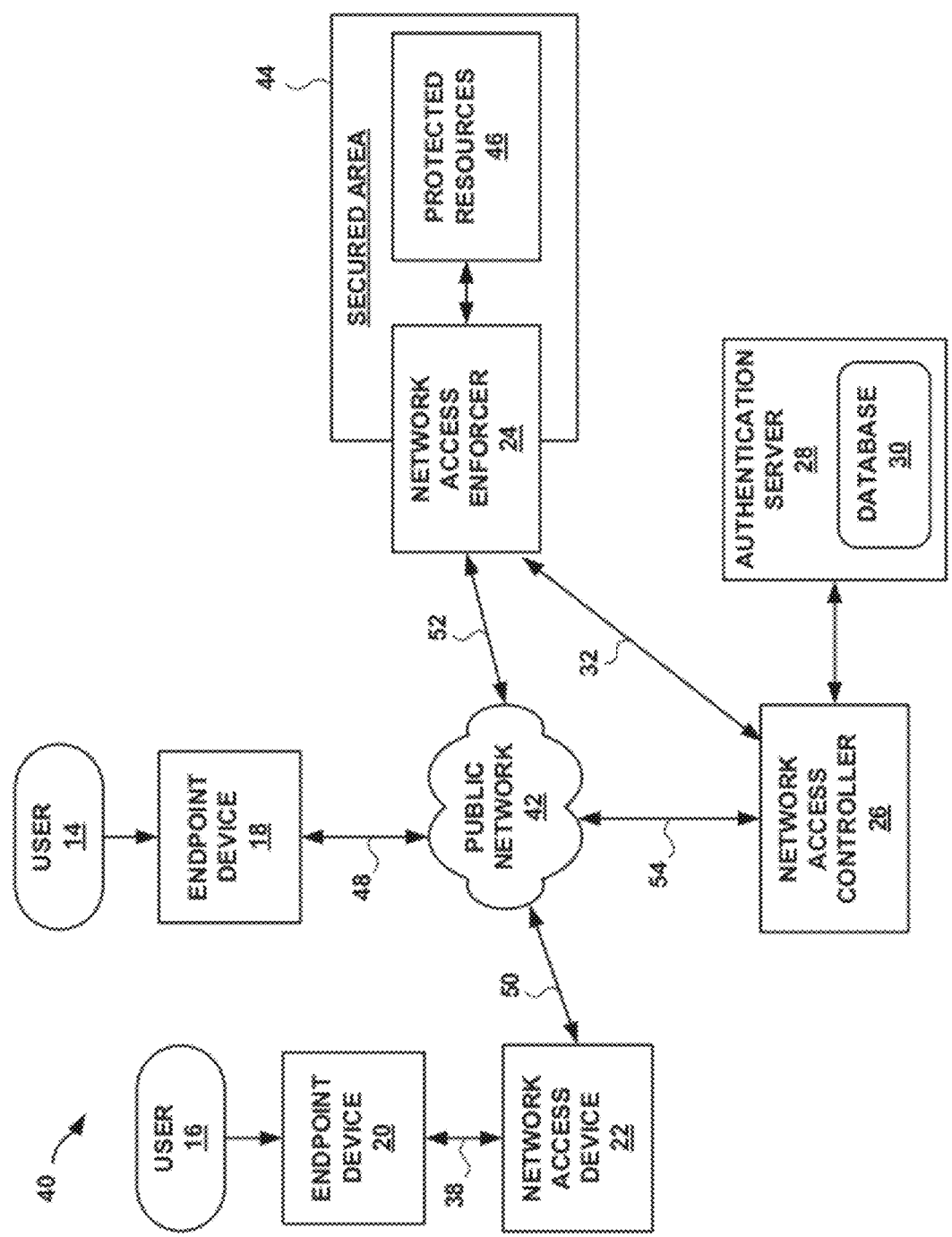
FIG. 2 is a block diagram illustrating another exemplary network system that implements network access control according to the techniques described in this disclosure.

FIG. 2 is a block diagram illustrating another exemplary network system 40 that implements network access control according to the techniques described in this disclosure. Network system 40 contains many components that are the same or similar to network system 10 illustrated in FIG. 1. In this regard, like components are numbered with like reference numerals. Network system 40 includes users 14, 16, endpoint devices 18, 20, network access device 22, network access enforcer 24, network access controller 26, authentication server 28, public network 42, and secured network 44. Secured network 44 contains protected resources 46, which may be any database, set of applications, or servers for which secured access is desired. Network access enforcer 24 is located at the edge of secured network 44 in order to enforce security policies with respect to protected resources 46.

Public network 42 represents an unsecured network or an enterprise network having basic authentication security features or no authentication. Public network 42 may comprise any type of network capable of transmitting data, such as a layer three (L3) packet-switched network (e.g., the Internet) operating over one or more layer two (L2) networks (e.g., an Ethernet or multi-packet label switching (MPLS) network). Each of endpoint devices 18, 20, network access enforcer 24 and network access controller 26 may be coupled to public network 42 via links 48, 50, 52 and 54 respectively. As shown in FIG. 2, authentication server 28 may be isolated from public network 42 in order to protect authentication information contained in database 30. In other embodiments, authentication server 28 may be coupled directly to public network 42. Network access enforcer 24 and network access controller 26 may be coupled to each other via secure connection 32. Secure connection 32 provides an interface for network access controller 26 to transmit access policies and authorization tables to network access enforcer 24. Similar to network system 10 shown in FIG. 1, network access enforcer 24 and network access controller 26 may be integrated into a single network access controller placed at the boundary of the network.

Network system 40 operates in a manner similar to network system 10 described in FIG. 1 except that network access requests need not be forwarded by network access enforcer 24 to network access controller 26. Instead, endpoint devices 18, 20 and network access device may communicate directly with network access controller 26 via public network 42. When network access controller 26 grants a user access to the network, network access controller 26 may transmit policies or authorization tables to network access enforcer 24, which may then grant network access to users 14, 16 and/or endpoint devices 18, 20.

Network access controller 26 implements the modified lockout techniques of this disclosure when countermeasures are activated. In particular, network access controller 26 may analyze a history of network logins to determine if the login request satisfies a match condition. In some embodiments, network access controller 26 may analyze the network logins by analyzing one or more user profiles, location profiles, or enterprise profiles containing usual or typical network access behavior for the corresponding user, location, or enterprise. Network access controller 26 may grant users or endpoint devices access to network 12 when a valid login request is present and when the valid login request satisfies a match condition. On the contrary, if the network login request is not valid or if a valid login request does not satisfy the match condition, network access controller 26 may deny user 14 and endpoint device 18 access to network 12. In this manner, network access controller 26 provides a high security countermeasure that effectively slows down or prevents the execution of a password attack while providing minimal obstruction to normal network activity.

Figure 3:
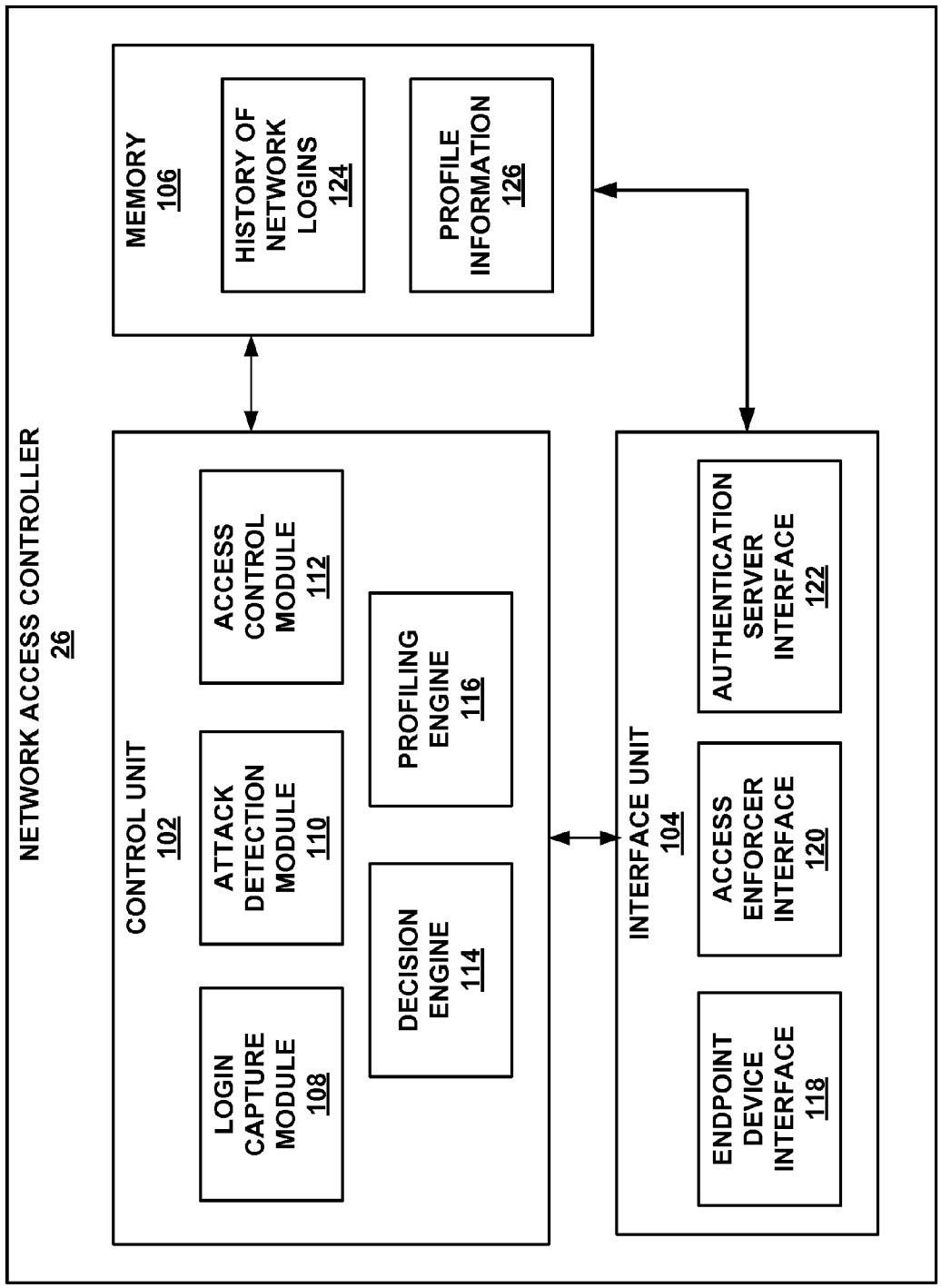
FIG. 3 is a block diagram illustrating the network access controller of FIGS. 1 and 2 in greater detail according to this disclosure.

FIG. 3 is a block diagram illustrating the network access controller 26 of FIGS. 1 and 2 in greater detail according to this disclosure. Network access controller 26 is configured to perform the modified lockout techniques described in this disclosure when countermeasures are activated. Network access controller 26 includes control unit 102, interface unit 104, and memory unit 106. Each of control unit 102, interface unit 104, and memory unit 106 may be operatively coupled to each of the other units within network access controller 26.

Control unit 102 is configured to implement the modified lockout techniques and algorithms described in this disclosure. Control unit 102 includes login capture module 108, attack detection module 110, access control module 112, decision engine 114, and profiling engine 116. Interface unit 104 provides communication links between network access controller 26 and the other components within network system 10. Interface unit 104 includes endpoint device interface 118, access enforcer interface 120, and authentication server interface 122. Control unit 102 and interface unit 104 may be implemented on one or more programmable processors comprising instructions that cause the processors to perform the network access control techniques according to this disclosure.

Memory 106 provides a storage medium for many of the data structures that are generated and used by control unit 102. Memory 106 may include a history of network logins block 124, and profile information block 126. Although memory 106 is illustrated in FIG. 3 as included within network access controller 26, memory unit 106 may also be located in an external database or server within network systems 10 and 40. Memory 106 may include any permanent or volatile memory that is capable of storing instructions and/or data.

Login capture module 108 is configured to receive network access requests from interface unit 104 or from access control module 112 and generate a history of network logins. The network access requests may include a login request having user-identity information as well as security credential information. Login capture module 108 may generate an entry in the history of network logins 124 for all or a subset of the login attempts received by network access controller 26. In some embodiments, login capture module 108 may generate login entries only for valid or successful logins (i.e. a history of successful logins). In other embodiments, login capture module 108 may create entries for logins irrespective of whether the login is valid or invalid (i.e. a history of successful and unsuccessful logins). Each entry may contain a field for a username and a password. In some embodiments, the password may be an encoded version of the password such as a cryptographic hash of the password for example. In addition, other fields may be included such as the time of day of the login request, the endpoint device used for the login request, the internet protocol (IP) address and/or subnet mask from where the login attempt originated, the services the user requested within the login request and other information pertinent to the login request. The history of network logins may be stored in the history of network logins block 124 of memory unit 106.

Attack detection module 110 is configured to detect symptoms of a network password attack and activate countermeasures in response to detecting the symptoms of the network password attack. A network password attack may refer to an on-line password guessing attack where a person or machine accesses one or more endpoint devices for the network and generates one or more login requests based on a guessing algorithm. One example of a password attack is the Hybrid Dictionary Attack.

Attack detection module 110 may use an intrusion detection algorithm to detect the symptoms of a network password attack. The intrusion detection algorithm may include existing signature-based algorithms or anomaly-based algorithms. One example of a signature-based algorithm includes determining the presence of a network password attack when a threshold number of invalid login requests occurs from a particular user, endpoint device, subnet, or other location within the network system. The threshold may be indicative of a normal amount of invalid login requests for a network. In some cases, the threshold number may be indicative of a desired policy set by the network administrator. For example, the threshold number may indicate the number of invalid login attempts that is deemed safe or acceptable for the particular network. One example of an anomaly-based algorithm includes determining the presence of a network password attack when a login attempt is from a new address that has never been used by the user.

After attack detection module 110 determines that a network password attack may be occurring, attack detection module 110 may activate one or more countermeasures in response to the detected password attack. The countermeasures may include a modified lockout algorithm according to this disclosure. In some embodiments, the modified lockout algorithm may include a modified broad lockout across the network. Under a modified broad lockout, network access controller 26 may grant network access only to login requests that satisfy one or more match conditions described herein. If the valid login request satisfies the match conditions, the login request is deemed to be safe by network access controller 26 and network access controller 26 may allow the user who issued the valid login request to access network 12. Otherwise, the login request may be rejected or additional security measures may be implemented to ensure that the login request is safe.

In other embodiments, the modified lockout algorithm may include a modified narrow lockout. For example, attack detection module 110 may determine that most of the invalid login attempt are originating from particular users, IP addresses, or subnets within network system 10 and only lockout those particular users, IP addresses, or subnets. If a subsequent valid login request originates from a user, IP address, or subnet targeted by the narrow lockout, network access controller 110 may grant access to the valid login request only if the valid login request satisfies certain match conditions as described herein.

In some embodiments, attack detection module 110 may activate several different countermeasures depending upon the severity or risk imposed by the symptoms of the network password attack. For example, attack detection module 110 may monitor the rate of invalid network login attempts by determining the number of invalid login attempts per hour. If the number of invalid login attempts exceeds a first threshold (e.g. fifty per hour above the normal rate), attack detection module 110 may activate a first countermeasure. For example, attack detection module 110 may invoke a subsequent challenge-response authentication protocol that sends a query to the user when the valid login request is deemed to be unusual (i.e. fails to satisfy one or more match conditions). If the number of invalid login attempts exceeds a second threshold (e.g. one hundred per hour above the normal rate), attack detection module 110 may activate a second countermeasure. For example, attack detection module 110 may invoke a modified broad lockout, which may grant access only to valid login requests that are deemed to be usual (i.e. satisfy one or more match conditions). If the number of invalid login attempts exceeds a third threshold (e.g. two hundred per hour above the normal rate), attack detection module 110 may activate a third countermeasure. For example, attack detection module 110 may invoke a broad lockout and only grant access to valid login request that present valid user tokens.

Access control module 112 is configured to receive login requests from endpoint devices, and control access to network 12 by granting or denying users and/or endpoint devices access to network 12. The login request may include a username and a password corresponding to the username. The login request may be transmitted to network access controller 26 from a user, an endpoint device, or a network access device within the network system. Access control module 112 may receive the login request from any of these devices via endpoint device interface 118. Upon receiving a login request, access control module 112 may send an authentication request containing the login request to authentication server 28 via authentication server interface 122. Authentication server 28 may process the authentication request and send a response message to access control module 112 indicating whether the login request was a valid login request or an invalid login request. A valid login request may refer to a login request that includes a valid username and a valid password corresponding to the valid username. Likewise, an invalid login request may refer to a login request where either the username or password is invalid, both the username and password are invalid, or the password does not correspond to the username.

While countermeasures are activated, access control module 112 may grant and deny access to network 12 according to requirements of one of the modified lockout algorithms described in this disclosure. According to one modified lockout algorithm, access control module 112 may be configured to grant a user or endpoint access to the network when the valid login request satisfies a match condition, and deny the user or endpoint access to the network when the login request does not satisfy the match condition. Access control module 112 utilizes decision engine 114 to determine whether a valid login request satisfies one or more match conditions. The decision of whether to grant or deny access may be based upon security credential authentication and any countermeasures that may be activated by attack detection module 110. Access control module 112 may grant or deny users and endpoints access to network 12 by sending configuration data to network access enforcer 24. The configuration data may contain policies and access tables specifying which users and/or endpoints may access network 12. Network access enforcer 24 may in turn grant or deny access to network 12 based on the configuration data.

In some embodiments, access control module 112 may be further configured to invoke a subsequent challenge-response authentication protocol that sends a query to the user or endpoint device when the valid login request does not satisfy the match condition. The query may be used to determine if the user is a human user. Access control module 112 may then grant the user access to the network when the user successfully responds to the query, and deny the user access to the network when the user does not successfully respond to the query. An example of a subsequent challenge-response authentication protocol includes a Completely Automated Public Turing test to tell Computers and Humans Apart (CAPTCHA).

Decision engine 114 is configured to analyze the history of network logins in order to determine whether the valid login request satisfies a match condition. In one embodiment, decision engine 114 may analyze the history of network logins to determine whether the valid login request satisfies the match condition at least in part by comparing one or more characteristics of the valid login attempt to one or more corresponding characteristics in a plurality of login entries in the history of successful network logins. The characteristics may comprise one or more fields in the history of network logins. Decision engine 114 may then determine that the valid login request satisfies the match condition when the one or more characteristics of the valid login attempt match the one or more corresponding characteristics in at least a threshold number of valid login entries in the history of successful network logins. The threshold may be indicative of a number of successful login attempts having specific parameters that are required to occur within network system 10 before such a successful login attempt is considered to be usual. In other cases, the threshold may be indicative of a security policy set by a network administrator or network security device. In one example, the threshold number of valid login entries may be at least two valid login entries in the history of successful network logins.

In other embodiments, decision engine 114 may rely on profiling engine 116 to perform additional analysis of the history of network logins. For example, profiling engine 116 may analyze the history of network logins to determine what conditions are usual or typical for a particular class of network logins. The class of network logins may include logins from a particular user, or logins from a particular location or enterprise within the network. Decision engine 114 may utilize this additional analysis to determine whether a valid login request satisfies a match condition.

In one embodiment, profiling engine 116 may be configured to process the history of successful network logins to generate a user profile of successful logins associated with the user. The user profile of successful logins may include statistical expressions for one or more parameters of typical login conditions for a user based upon logins for the user contained in the history of successful network logins. For example, profiling engine 116 may analyze the history of network logins to determine what conditions are usual or typical for a particular class of network logins. Statistical techniques may be used to analyze the history of network logins in order to determine a value for a particular login parameter as well as defined statistical confidence levels for that value. In this way, the profile for a user may be viewed as a concise statistical expression of usual or typical login conditions for a user based on that user's history. Example parameters may include the usual computer, IP address, or subnet where a user usually accesses the network, or a time of day that the user typically logs in. In some embodiments, the user profile of successful logins may be configurable by the user or a network administrator.

In another embodiment, profiling engine 116 may be configured to process the history of successful network logins to generate a location profile of successful logins associated with a location of the network. The location profile of successful logins may include a statistical expression for one or more parameters of typical login conditions for a location based upon logins for the location contained in the history of successful network logins. As one example, the parameter may include the typical number of login attempts from a particular network location for a particular time of day. In some embodiments, the location profiles may include enterprise profiles, where enterprise-wide login statistics are calculated for each enterprise within a multi-enterprise network.

In addition, classical statistical significance tests and other statistical techniques may be used to analyze the history of network logins to determine which parameters are good indicators of usual or unusual conditions for a particular class of network logins. For example, perhaps the time of day at which a user logs into the network exhibits a high degree of randomness. In such a case, profiling engine 116 may use statistical significance tests to recognize the large variance in the time of day parameter and eliminate the parameter as a good indicator of usual and unusual conditions for the particular class of network logins.

In some embodiments, profiling engine 116 may be further configured to generate an attack profile of a network password attack. An attack profile may comprise a history of unsuccessful logins that take place when attack detection module 110 deems that an attack is occurring. Similar to the profile of successful logins, profiling engine 116 may analyze a history of unsuccessful logins to generate statistical expressions for specific parameters that are indicative of the type of attack that is occurring. For example, profiling engine 116 may analyze the history of unsuccessful logins to calculate a parameter indicating an intensity level of the attack. The attack intensity level may be based on the rate of invalid login attempts. Other example parameters include what addresses or locations within the network most of the attacks are originating from, whether the attack rotates IP addresses within a subnet, and whether the attack utilizes particular usernames when generating login requests or utilizes all usernames equally. It should be understood that these parameters are merely exemplary, and that the attack profile may contain any parameters related to one or more characteristics of the attack. Decision engine 114 may utilize the attack profile along with other user or location profiles to determine whether a current login request is likely to be from a legitimate network user or part of a password attack.

Profiling engine 116 may comprise one or more individual profiling engines that generate profiles of network logins according to one or more parameters. For example, a user profiling engine may generate user profiles and a location profiling engine may generate location profiles. In addition, an attack profiling engine may generate attack profiles.

In additional embodiments, decision engine 114 may use a probabilistic model to further analyze the history of network logins in order to determine whether the valid login request satisfies a match condition. Decision engine 114 may generate the probabilistic model based upon the history of network logins or based upon any of the profiles discussed herein. Decision engine 114 may generate the probabilistic model by choosing a set of random variables to represent parameters of interest with respect to network login requests. Decision engine 114 may also assign probabilities (i.e. probability distributions and probability density functions) to one or more of the random variables. The assigned probabilities may be expressed as prior probabilities and conditional probabilities. Decision engine 114 may use the probabilistic model to calculate a posterior probability that the valid login request is from a legitimate user given one or more characteristics of the valid login request. Decision engine 114 may then determine that the valid login request satisfies the match condition when the posterior probability that the valid login request is from a legitimate user is above a threshold. The threshold may be indicative of a security policy or a perceived level of security risk in the network. In one embodiment, the threshold may be based on the rate of invalid login attempts that is currently taking place within network system 10. For example, if the rate of invalid login attempts is high, the perceived level of security risk may also be high. In such a case, a higher value would be set for the threshold.

An example probabilistic model that may be used by decision engine 114 is a Bayesian network. The Bayesian network may include a plurality of nodes and a plurality of arcs. Each node in the Bayesian network may represent a parameter of interest, such as a random variable, and each arc may interconnect two different nodes within the Bayesian network. The direction of the arcs may represent conditional dependencies between two parameters of interest represented by the two different nodes. As one example, the Bayesian network may include a node representing a random variable that the valid login request is from an authorized or legitimate user of the network. Arcs may flow outwardly from this node to other nodes in the Bayesian network. Decision engine 114 may calculate conditional probabilities for each of the transitions within the Bayesian network based on the history of network logins or based upon one of the profiles generated by profiling engine 116. As part of the modified lockout algorithm, decision engine 114 may use the Bayesian network to calculate the posterior probability that the valid login request is from a legitimate or authorized user given certain characteristics of the valid login requests, and in some cases, given certain characteristics of an attack in progress.

In addition, profiling engine 116 may generate a normal profile of network logins. The normal profile of network logins may include logins that occur when attack detection module 110 or a system administrator determines that a network password attack is not occurring (i.e. during normal operation of the network). In some embodiments, the history of network logins may include only those logins which are contained in the normal profile. In other embodiments, the history of network logins may include logins contained within the normal profile as well as logins that occur during a network password attack. In any case, utilizing normal profiles as part of the analysis performed by decision engine 114 may assist in preventing a network attacker from "mis-training" network access controller 26 to recognize attack activity as normal network activity.

Endpoint device interface 118 provides communications between network access controller 26 and various devices issuing login requests within network system 10. Endpoint device interface 118 may receive login requests from endpoint devices 18, 20 or from network access device 22 and forward the requests to access control module 112. Endpoint device interface 118 may also transmit messages to endpoint devices 18, 20 indicating if the endpoint device is allowed to access network 12. Endpoint device interface 118 may communicate using various communication protocols. For example, endpoint device interface 118 may transmit and receive messages in accordance with an Extensible Authentication Protocol (EAP), a Hypertext Transfer Protocol (HTTP), or a Remote Authentication Dial In User Service (RADIUS) network authentication protocol.

Access enforcer interface 120 provides communications between network access enforcer 24 and network access controller 26. Access enforcer interface 120 may send configuration data issued by access control module 112 to network access enforcer 24 in order to grant or deny users and/or endpoint devices 18, 20 access to network 12. The configuration data may contain policies and access tables specifying which users and/or endpoint devices 18, 20 may access network 12. Network access enforcer 24 may in turn grant or deny access to network 12 based on the configuration data. Access enforcer interface 120 may also receive login requests that are forwarded from network access enforcer 24.

Authentication server interface 122 provides communications between network access controller 26 and authentication server 28. Authentication server interface 122 may transmit authentication requests issued by access control module 112 to authentication server 28 and forward responses received from authentication server 28 to access control module 112. Authentication server interface 122 may communicate with authentication server 28 in accordance with a Remote Authentication Dial In User Service (RADIUS) network authentication protocol.

History of network logins block 124 may include any information related to past and present login attempts. The history of network logins block 124 may include a series of login entries corresponding to successful (i.e. valid) as well as unsuccessful (i.e. invalid) login attempts. Each login entry may contain a field for a username and a password of the login attempt. In some embodiments, the password may be a hashed password in order to protect the confidentiality of the actual password. In addition, other fields may be included such as the time of day of the login request, the endpoint device used for the login request, the internet protocol (IP) address and/or subnet mask from where the login attempt originated, the services the user requested within the login request, whether the login attempt is valid, and other information pertinent to the login request.

Profile information block 126 contains profiling information generated by profiling engine 116. Profile information block 126 may store information related to user profiles, location profiles, enterprise profiles, attack profiles, and normal profiles. The profiles may contain statistical expressions for one or more parameters of typical login conditions for a particular class of logins. For example, a user profile may contain a parameter indicating the usual computer from which a user typically logs into the network.

Figure 4:
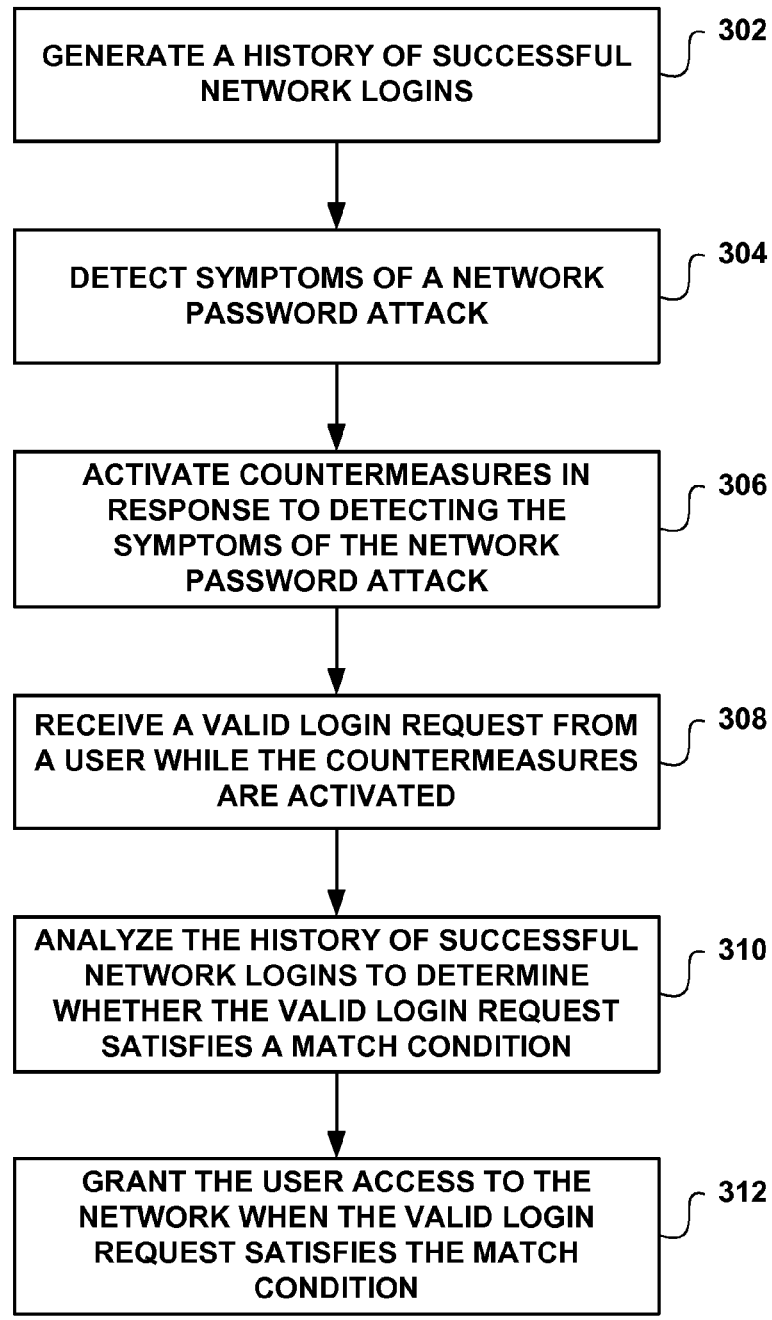
FIG. 4 is a flowchart illustrating example operation of a network access controller implementing the network access control techniques described in this disclosure.

FIG. 4 is a flowchart illustrating example operation of a network access controller 26 implementing the network access control techniques described in this disclosure. As shown in FIG. 4, login capture module 108 may generate a history of successful network logins (302). Attack detection module 110 may detect symptoms of a network password attack (304). Attack detection module 110 may activate countermeasures in response to detecting the symptoms of the network password attack (306). The countermeasures may include the modified lockout algorithms described in this disclosure. Access control module 112 may receive a valid login request from a user while the countermeasures are activated (308). The valid login request may include a valid username and a valid password corresponding to the valid username.

As part of the modified lockout algorithm, decision engine 114 may analyze the history of network logins to determine whether the valid login request satisfies a match condition (310). In one embodiment, decision engine 114 may compare one or more characteristics of the valid login attempt to one or more corresponding characteristics in a login entry of the history of successful network logins, and determine that the valid login request satisfies the match condition when the one or more characteristics of the valid login attempt match the one or more corresponding characteristics in the login entry of the history of successful network logins. In another embodiment, decision engine 114 may compare one or more characteristics of the valid login attempt to one or more corresponding characteristics in a plurality of login entries in the history of successful network logins, and determine that the valid login request satisfies the match condition when the one or more characteristics of the valid login attempt match the one or more corresponding characteristics in at least a threshold number of valid login entries in the history of successful network logins. In one embodiment, the threshold number of valid entries may be at least two valid login entries in the history of successful network logins.

In some embodiments, profiling engine 116 may process the history of successful network logins to generate a user profile of successful logins associated with the user. The user profile of successful logins may include statistical expressions for one or more parameters of typical login conditions for a user based upon logins for the user contained in the history of successful network logins. In such embodiments, decision engine 114 may analyze the history of network logins by comparing one or more characteristics of the valid login attempt to the one or more statistical expressions for the corresponding parameters in the user profile of successful logins to determine whether the valid login request satisfies the match condition. In further embodiments, the user profile of successful logins may be configurable by the user or a network administrator.

In order to generate the user profile of successful logins, profiling engine 116 may calculate a statistical expression, such as a confidence interval, for at least one parameter for the user based on the history of network logins. The calculated parameter may include at least one of a usual computer logged into by the user, a time of day when the user usually accesses the network, or a subnet where the user usually accesses the network.

In other embodiments, profiling engine 116 may process the history of successful network logins to generate a location profile of successful logins associated with a location of the network. The location profile of successful logins may include statistical expressions for one or more parameters of typical login conditions for a location based upon logins for the location contained in the history of successful network logins. In such embodiments, decision engine 114 may analyze the history of network logins by comparing one or more characteristics of the valid login attempt to one or more corresponding parameters in the location profile of successful logins to determine whether the valid login request satisfies the match condition.

In further embodiments, profiling engine 116 may generate a normal profile of network logins based on the history of network logins. The normal profile of network logins comprises login requests that occur when a network password attack is not occurring. Profiling engine 116 may in turn use only logins within the normal profile of network logins to generate the other user profiles and location profiles for use by decision engine 114.

In some embodiments, decision engine 114 may generate a probabilistic model based in part on the history of network logins. Decision engine 114 may generate the probabilistic model based upon the history of network logins or based upon any of the profiles discussed herein. Decision engine 114 may generate the probabilistic model by choosing a set of random variables to represent parameters of interest with respect to network login requests. Decision engine 114 may also assign probabilities (i.e. probability distributions and probability density functions) to one or more of the random variables. The assigned probabilities may include prior probabilities and conditional probabilities. Based on the probabilistic model, decision engine 114 may calculate a posterior probability that the valid login request is from a legitimate user given one or more characteristics of the valid login request. After the posterior probability is calculated, decision engine 114 may determine that the valid login request satisfies the match condition when the posterior probability that the valid login request is from a legitimate user is above a threshold.

In some embodiments, profiling engine 116 may generate an attack profile of the network password attack. Profiling engine 116 may analyze a history of unsuccessful logins to generate statistical expressions for specific parameters that are indicative of the type of attack that is occurring. Decision engine 114 may then compare one or more characteristics of the login attempt to corresponding characteristics in one or more of the attack profiles login profiles, or the history of successful login attempts to determine whether the valid login request satisfies the match condition. In other words, decision engine 114 may utilize the attack profile along with other user or location profiles to determine whether a current login request is likely to be from a legitimate network user or part of a password attack.

Example parameters include intensity level of the attack, what addresses or locations within the network most of the attacks are originating from, whether the attack rotates IP addresses within a subnet, and whether the attack utilizes particular usernames when generating login requests or utilizes all usernames equally. In some cases, decision engine 114 may perform classic statistical significance tests to determine which parameters are good predictors of whether a login attempt is from a legitimate user or is part of an attack.

Access control module 112 may grant the user access to the network when the valid login request satisfies the match condition (312). In addition, access control module 112 may deny the user access to the network when the login request does not satisfy the match condition. In some embodiments, access control module 112 may invoke a subsequent challenge-response authentication protocol that sends a query to the user when the valid login request does not satisfy the match condition to determine if the user is a human user and grant the user access to the network when the user successfully responds to the query. The subsequent challenge-response authentication protocol may include a Completely Automated Public Turing test to tell Computers and Humans Apart (CAPTCHA).

Figure 5:
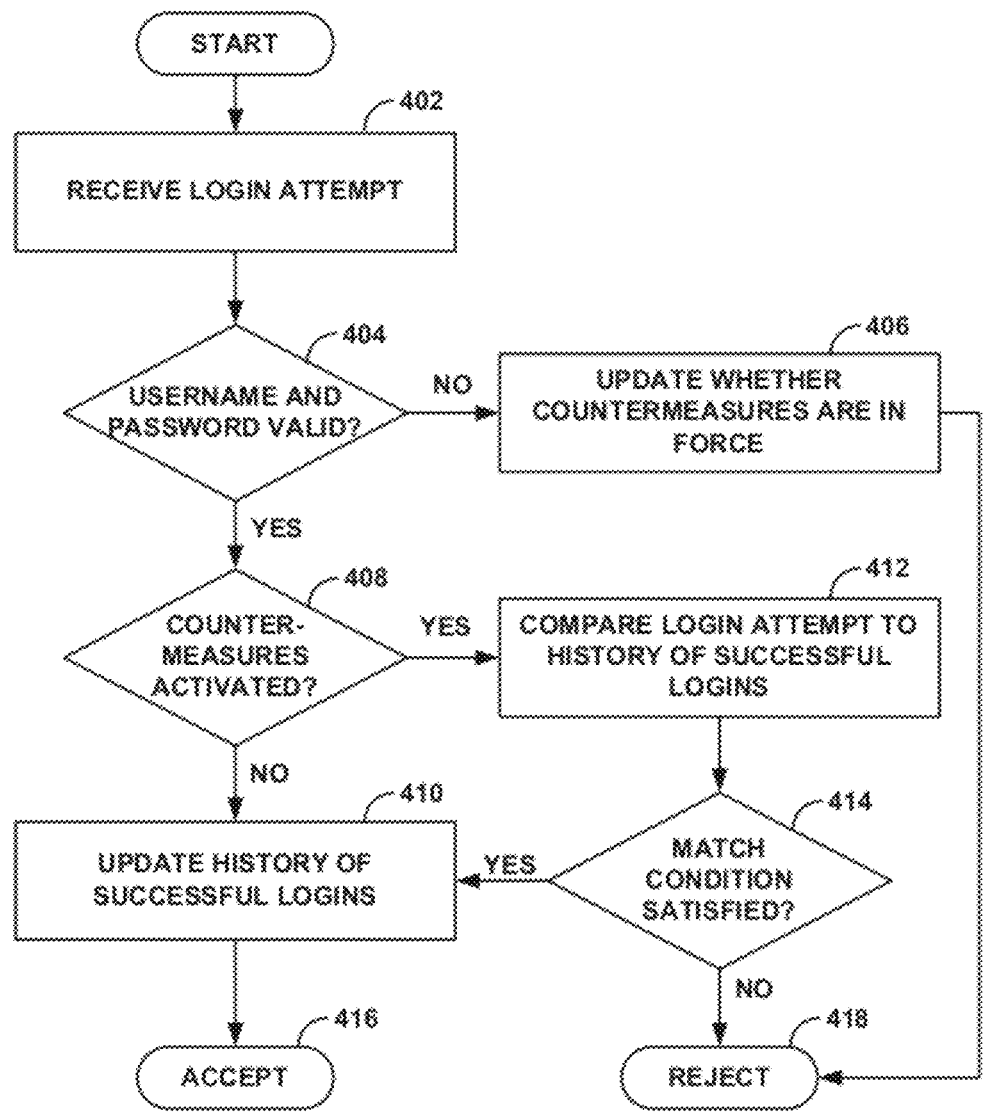
FIG. 5 is a flowchart illustrating example operation of a network access controller implementing the network access control techniques according to this disclosure.

FIG. 5 is a flowchart illustrating another example operation of an authentication server implementing the network access control techniques described in this disclosure. Login capture module 108 may receive a login attempt (402). Access control module 112 may determine whether the login attempt is valid by determining whether the login attempt contains a valid username and password (404). If the login attempt does not contain a valid username and password combination, attack detection module 110 may update whether countermeasures are in force (406), and access control module 114 may reject the login attempt (418). If the login attempt contains a valid username and password combination, access control module 112 determines whether countermeasures are activated (408). If countermeasures are not activated, login capture module 108 may update the history of successful logins (410) and access control module 112 may accept the login (416). If countermeasures are activated, decision engine 114 may compare the login attempt to a history of successful logins (412). Decision engine 114 may then determine whether a match condition is satisfied based on the comparison of the login attempt to the history of successful logins (414). If the match condition is satisfied, login capture module 108 updates the history of successful logins (410) and access control module 112 accepts the login attempt (416). If the match condition is not satisfied, access control module 112 rejects the login attempt (418).

In some embodiments, the match condition may include determining whether one or more characteristics of the login attempt match one or more characteristics in the history of network logins. In other embodiments, the match condition may include determining whether one or more characteristics of the login attempt is usual (e.g., is within a confidence interval of the "usual" value of a particular parameter). In yet other embodiments, the match condition may include determining a posterior probability that the login attempt is from a legitimate user given various characteristics of the login attempt.

Figure 6:
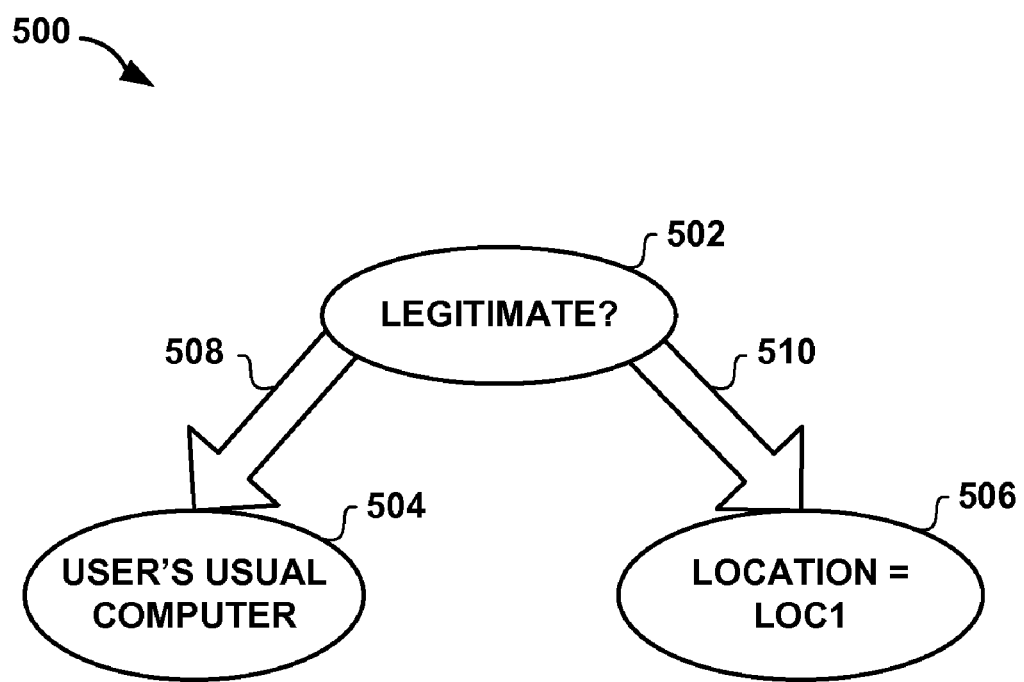
FIG. 6 is a conceptual diagram illustrating an example Bayesian network, which may be used in a network access controller of this disclosure.

FIG. 6 is a conceptual diagram illustrating an example simplified Bayesian network 500, which may be used within a network access server of this disclosure. In general, a Bayesian network designed in accordance with this disclosure may include a plurality of nodes and arcs (i.e. directed links) interconnecting the nodes. Each individual node within the Bayesian network may represent a distinct variable or parameter associated with a real or hypothetical login request within network system 10. The variables may include discrete random variables, which take on a finite set of values or states, and continuous random variables, which take on an infinite number of values or states within a range. The nodes within the Bayesian network may be connected by a series of arcs, which represent causal relationships between the nodes. The nature of these causal relationships may be mathematically modeled using conditional probabilities. Thus, the arcs in the Bayesian network may also represent conditional (i.e. probabilistic) dependencies between the nodes in Bayesian network. If there is an arc or arrow that originates from a first node and terminates at a second node, the first node may be referred to as a parent of the second node. Likewise, the second node may be referred to as a child of the first node.

One or more conditional probabilities may be assigned to each of the arcs indicating the probabilistic relationship between the nodes. The conditional probabilities may include a probability distribution or a probability density function for the random variable represented by the child node conditioned upon the random variable represented by the parent node. In other words, the conditional probability may represent the likelihood of a particular state of the random variable represented by the child node given the state of the variable represented by the parent node. In some cases, a Conditional Probability Table (CPT) may be generated for each child node within the Bayesian network. The CPT for the child node may include the conditional probabilities assigned to each of the arcs that terminate at the child node. Moreover, a prior probability table may be generated for each root node (i.e. a parent node that has no arcs terminating at the node). A prior probability table may include a probability distribution or probability density function for the random variable associated with the node. Both the conditional probabilities associated with child nodes and the prior probabilities associated with root nodes may be generally referred to as probabilities in this disclosure.

Decision engine 114 may populate the CPTs and the prior probability tables with probabilities, probability distribution functions, and probability density functions derived from network data as well as from expert input. A probability derived solely from network data may be referred to as a classical probability or a physical probability. A classical probability may be derived from data received from the history of network logins and from one or more of the profiles generated by profiling engine 116. A classical probability may also be derived from calculations or statistical manipulations performed upon measured data within the network. A probability that is derived entirely or in part by expert input may be referred to as a Bayesian probability or a personal probability. In one example, the expert input is received from a network administrator and may be based upon a degree of belief or an estimate made by the administrator. In some embodiments, the expert input may be based upon a network security policy.

In addition to populating the CPTs and prior probability tables within a Bayesian network, decision engine 114 may, in some embodiments, determine particular variables or parameters to include as nodes within the Bayesian network and particular arcs or interconnections between the nodes based on historical data. In other embodiments, decision engine 114 may receive this information from an outside source, such as a network administrator. In any case, decision engine 114 is capable of building a Bayesian network based solely upon measured data (i.e. an analysis of the history of network logins), solely upon expert input, or based upon a synthesis of measured data and expert input.

As shown in FIG. 6, Bayesian network 500 includes nodes 502, 504, 506, and arcs 508, 510. Node 502 represents a parameter that indicates whether a login is from a legitimate or authorized user of network 10. Node 504 represents a parameter that indicates whether a login originated from the usual computer of the user contained in the username of the login request. The usual computer of a user may be determined by profiling engine 116. For example, profiling engine 116 may apply statistical techniques to a history of successful logins to determine a parameter indicative of a usual computer of the user. This parameter may be a part of the user profile. Node 506 represents a parameter that indicates whether a login originates from a particular location (e.g. LOC1) in the network. The location may be an IP address, subnet, remote verses local, or other variable representative of a portion of the network. In the example Bayesian network of FIG. 6, each of the parameters associated with nodes 502, 504, 506 are Boolean random variables and may take on one of two distinct values. That is, each of the parameters for nodes 502, 504, 506 may be equal to a value of "yes" or "no" for a particular event in network 12.

According to FIG. 6, arc 508 defines a causal relationship from node 502 to node 504, and arc 510 defines a causal relationship from node 502 to node 506. The direction of arc 508 indicates that the state of node 502 may influence the state of node 504, and the direction of arc 510 indicates that the state of node 502 may influence the state of node 506. The configuration of Bayesian network 500 depicts that whether a login comes from the user's usual computer and whether it comes from location "LOC 1" are conditionally independent, given that the login attempt is legitimate or illegitimate. That is, among legitimate login attempts, the fraction of usual-computer logins is the same in one location as in another. It should be noted that Bayesian network 500 and the conditional dependencies depicted therein are provided for illustrative purposes only, and that other Bayesian networks having more or fewer parameters and various combinations of conditional dependencies are within the scope of this invention. For example, some Bayesian networks may be constructed using location-specific statistics.

Decision engine 114 may calculate probabilities for each of the nodes 502, 504, 506 within Bayesian network 500 based on the history of network logins, based upon a profile generated by profiling engine 116, or based upon expert input. The probabilities may be estimated based upon empirical data and/or upon a belief. As one example, the following Table 1 illustrates exemplary probability tables for nodes 502, 504 and 506 as described above:

| Node | Probabilities |
|---|---|
| 502 | P(legitimate) = 3/8 |
|  | P(~legitimate) = 5/8 |
| 504 | P(usual computer | legitimate) = 0.9 |
|  | P(~usual computer | legitimate) = 0.1 |
|  | P(usual computer | ~legitimate) = 0.02 |
|  | P(~usual computer | ~legitimate) = 0.98 |
| 506 | P(location = loc1 | legitimate) = 0.1 |
|  | P(~location = loc1 | legitimate) = 0.9 |
|  | P(location = loc1 | ~legitimate) = 0.5 |
|  | P(~location = loc1 | ~legitimate) = 0.5 |

In Table 1, the "~" symbol refers to the logical "not" operation. For example, P(~legitimate) is the probability that a login request is not from a legitimate user. With respect to node 502, decision engine 114 may calculate a prior probability that a given login request is legitimate, i.e. P(legitimate). The prior probability may be an instantaneous probability based on current measured data (i.e. evidence) and/or upon a degree of belief of a system administrator. For example, the prior probability that a login request is legitimate may be based on a current rate of invalid login attempts combined with a belief of how many login requests are legitimate based on the current rate of invalid login attempts. In the example shown in Table 1, decision engine 114 determines that P(legitimate) is equal to 3/8 because, according to the attack profile, the rate of invalid login attempts in the network is so much above normal that network access controller 26 or an administrator may infer that 5/8 of the login attempts are illegitimate.

The probabilities for nodes 504 and 506 include conditional probabilities, because arcs 508 and 510 terminate at nodes 504, 506 respectively. In the example, the conditional probabilities for node 504 include a conditional probability that a given login request is from the usual computer of a user given that the login request is from a legitimate user of the network, i.e. P(usual computer|legitimate). In some embodiments, this conditional probability may be obtained directly from the history of network logins. In other embodiments, profiling engine 116 may generate a normal profile of logins. The normal profile of logins may include logins that occur when attack detection module 110 determines that a network password attack is not occurring (i.e. during normal operation of the network). Thus, most of the network login requests in the normal profile may be assumed to be from a legitimate network user. In the example shown in Table 1, decision engine 114 determines that P(usual computer|legitimate) is equal to 0.9 because, according to the normal profile, 9/10 of login requests (i.e. legitimate login requests) are originating from the usual computer of the user indicated by the username in the login request.

The conditional probabilities for node 504 also include a conditional probability that a given login request is from the usual computer of a user given that the login request is not from a legitimate user of the network, i.e. P(usual computer|~legitimate). This conditional probability may be obtained from an attack profile. For example, if the attack is originating from a set of endpoint devices, one of which is the usual computer of the username contained in the login request, the conditional probability may be relatively high. On the contrary, if the attack is originating from a set of endpoint devices, which do not include the usual computer of the username contained in the login request, the conditional probability may be relatively low. In the example shown in Table 1, decision engine 114 determines that P(usual computer|~legitimate) is equal to 0.02 because, according to the attack profile, only 2% of login requests (i.e. illegitimate login requests) are originating from the usual computer of the user who requested the current login request.

The conditional probabilities for node 506 include a conditional probability that a login request is from location "LOC1" of the network given that the login request is from a legitimate user of the network, i.e. P(location=loc1|legitimate). In one embodiment, this conditional probability may be obtained from the history of network logins. In another embodiment, profiling engine 116 may generate a normal profile of logins, which may include logins that occur when attack detection module 110 determines that a network password attack is not occurring (i.e. during normal operation of the network). In the example shown in Table 1, decision engine 114 determines that P(location=loc1|legitimate) is equal 0.1 because a tenth of login attempts in the normal profile originate from location "LOC1" within the network.

The conditional probabilities for node 506 may also include a conditional probability that a given login request is from the location "LOC1" of the network given that the login request is not from a legitimate user of the network, i.e. P(location=loc1|~legitimate). This conditional probability may be obtained from an attack profile. In the example shown in Table 1, decision engine 114 determines that P(location=loc1|~legitimate) is equal to 0.5 because, according to the attack profile, half of the invalid login attempts originate from LOC1 within the network.

Based on Bayesian network 500 and the probabilities calculated for each node, decision engine 114 may be able to calculate a posterior probability that a current login request is from a legitimate user of the network given certain evidence. For example, given that a current login request originates from the usual computer of the username contained in the login request and that the login request originates from the LOC1 location within the network, decision engine may be able to calculate a posterior probability that the current login request is from a legitimate user of the network (i.e. not part of an attack) based on the given evidence, i.e. P(legitimate|usual computer^location=loc1). Decision engine 114 may use Bayes' Rule and other statistical techniques to calculate the posterior probability.

According to Bayesian network 500 depicted in FIG. 6, whether or not a login attempt is a valid login attempt is not an input parameter. That is, decision engine 114 may decide whether a login attempt is legitimate or illegitimate without regard to whether the login is valid or not. In other embodiments, decision engine 114 may use information relating to whether the login request is valid to decide whether a login attempt is legitimate or illegitimate.

Various embodiments of the invention have been described. These and other embodiments are within the scope of the following claims. Although described above with respect to controlling access to a network, the techniques may apply equally to devices that control access to any secure resource using a password-based authentication protocol. The techniques therefore may apply to any device that utilizes a password-based authentication protocol to authenticate users regardless of the underlying secure resource. For example, the techniques in this disclosure may be used for controlling access to web servers, application servers, ATMs, and other computing resources. These and other embodiments are within the scope of the following claims.

The invention claimed is:

1. A method for controlling access to a network comprising:
   generating a history of successful network logins;
   detecting symptoms of a network password attack;
   activating a lockout for the network in response to detecting the symptoms of the network password attack;
   receiving a valid login request from a user while the lockout is activated, wherein the valid login request comprises a valid username and a valid password corresponding to the valid username; and
   while the lockout is activated, analyzing the history of successful network logins to determine whether the valid login request satisfies a match condition, granting the user access to the network when the valid login request satisfies the match condition, and denying the user access to the network when the valid login request does not satisfy the match condition even though the valid login request contains the valid username and the valid password.

2. The method of claim 1, wherein analyzing the history of successful network logins to determine whether the valid login request satisfies the match condition comprises:
   comparing one or more characteristics of the valid login request to one or more corresponding characteristics in a login entry of the history of successful network logins; and
   determining that the valid login request satisfies the match condition when the one or more characteristics of the valid login request match the one or more corresponding characteristics in the login entry of the history of successful network logins.

3. The method of claim 1, wherein analyzing the history of successful network logins to determine whether the valid login request satisfies the match condition comprises:
   comparing one or more characteristics of the valid login request to one or more corresponding characteristics in a plurality of login entries in the history of successful network logins; and determining that the valid login request satisfies the match condition when the one or more characteristics of the valid login request match the one or more corresponding characteristics in at least a threshold number of valid login entries in the history of successful network logins, wherein the threshold number is at least two valid login entries in the history of successful network logins.

4. The method of claim 1, wherein the history of successful network logins comprises at least one of username information, location information, subnet information, time information, network access point information, and accessed service information for a plurality of login requests.

5. The method of claim 1, wherein analyzing the history of successful network logins comprises:
processing the history of successful network logins to generate a user profile of successful logins associated with the user, wherein the user profile of successful logins comprises a statistical expression for one or more parameters of typical login conditions for the user based upon logins for the user contained in the history of successful network logins; and
comparing one or more characteristics of the valid login request to one or more statistical expressions for the corresponding parameters in the user profile of successful logins to determine whether the valid login request satisfies the match condition.

6. The method of claim 5, wherein the one or more parameters comprise at least one of a computer logged into by the user, a time of day when the user accesses the network, a subnet where the user accesses the network, a network access point where the user accesses the network, and a set of services which the user accesses.

7. The method of claim 5, wherein the user profile of successful logins is configurable by the user or a network administrator.

8. The method of claim 5, further comprising:
determining the one or more parameters of typical login conditions by using statistical significance tests such that the one or more parameters are indicative of whether a particular login request is from a legitimate user.

9. The method of claim 1, wherein analyzing the history of successful network logins comprises:
processing the history of successful network logins to generate a location profile of successful logins associated with a location of the network, wherein the location profile of successful logins comprises a statistical expression for one or more parameters of typical login conditions for a location based upon logins for the location contained in the history of successful network logins; and
comparing one or more characteristics of the valid login request to one or more statistical expressions for the corresponding parameters in the location profile of successful logins to determine whether the valid login request satisfies the match condition.

10. The method of claim 9, wherein the location profile comprises an enterprise profile associated with the network.

11. The method of claim 1, wherein analyzing the history of successful network logins to determine whether the valid login request satisfies the match condition comprises:
generating a probabilistic model based in part on the history of successful network logins;
calculating, based on the probabilistic model, a posterior probability that the valid login request is from a legitimate user given one or more characteristics of the valid login request; and
determining that the valid login request satisfies the match condition when the posterior probability that the valid login request is from a legitimate user is above a threshold.

12. The method of claim 11, wherein the probabilistic model is a Bayesian network comprising a plurality of nodes and a plurality of arcs, wherein each node represents a parameter of interest, and wherein each arc interconnects two different nodes within the Bayesian network and represents a causal relationship between two parameters of interest represented by the two different nodes.

13. The method of claim 1, wherein analyzing the history of successful network logins further comprises:
processing a history of unsuccessful network logins to generate an attack profile of the network password attack, wherein the attack profile comprises one or more statistical expressions for one or more parameters of typical login behavior associated with the network password attack; and
comparing one or more characteristics of the valid login request to the one or more statistical expressions for the one or more parameters in the attack profile to determine whether the valid login request satisfies the match condition.

14. The method of claim 13, wherein analyzing the history of successful network logins further comprises:
generating a probabilistic model based on the history of successful network logins and the attack profile;
calculating, based on the probabilistic model, a posterior probability that the valid login request is from a legitimate user given one or more characteristics of the valid login request and one or more characteristics of the attack; and
determining that the valid login request satisfies the match condition when the posterior probability that the valid login request is from a legitimate user is above a threshold.

15. The method of claim 13, wherein the attack profile includes a parameter indicating the intensity of the attack.

16. The method of claim 1, wherein analyzing the history of successful network logins to determine whether the valid login request satisfies a match condition comprises:
generating a normal profile of network logins based on the history of successful network logins, wherein the normal profile of network logins comprises login requests that occur when a network password attack is not occurring.

17. A device that controls access to a network, the device comprising:
a network interface for connection to a computer network;
one or more processors for execution of software instructions;
a login capture module executing on the one or more processors, the login capture module configured to generate a history of successful network logins;
an attack detection module executing on the one or more processors, the attack detection module configured to detect symptoms of a network password attack and to activate a lockout in response to detecting the symptoms of the network password attack;
an access control module executing on the one or more processors, the access control module configured to receive a valid login request from a user via the network interface while the lockout is activated, wherein the valid login request comprises a valid username and a valid password corresponding to the valid username; and a decision engine executing on the one or more processors, the decision engine configured to, while the lockout is activated, analyze the history of successful network logins to determine whether the valid login request satisfies a match condition, wherein the access control module is further configured to, while the lockout is activated, grant the user access to the network when the valid login request satisfies the match condition and deny the user access to the network when the valid login request does not satisfy the match condition even though the valid login request contains a valid username and a valid password.

18. The device of claim 17, wherein the decision engine is further configured to analyze the history of successful network logins to determine whether the valid login request satisfies the match condition at least in part by:

comparing one or more characteristics of the valid login request to one or more corresponding characteristics in a login entry of the history of successful network logins; and determining that the valid login request satisfies the match condition when the one or more characteristics of the valid login request match the one or more corresponding characteristics in the login entry of the history of successful network logins.

19. The device of claim 17, wherein the decision engine is further configured to analyze the history of successful network logins to determine whether the valid login request satisfies the match condition at least in part by:

comparing one or more characteristics of the valid login request to one or more corresponding characteristics in a plurality of login entries in the history of successful network logins; and determining that the valid login request satisfies the match condition when the one or more characteristics of the valid login request match the one or more corresponding characteristics in at least a threshold number of valid login entries in the history of successful network logins, wherein the threshold number is at least two valid login entries in the history of successful network logins.

20. The device of claim 17, wherein the history of successful network logins user comprises at least one of username information, location information, subnet information, time information, network access point information, and accessed service information for a plurality of login requests.

21. The device of claim 17, further comprising:

a profiling engine executing on the one or more processors and configured to process the history of successful network logins to generate a user profile of successful logins associated with the user, wherein the user profile of successful logins comprises a statistical expression for one or more parameters of typical login conditions for the user based upon logins for the user contained in the history of successful network logins, wherein the decision engine analyzes the history of successful network logins at least in part by comparing one or more characteristics of the valid login request to one or more statistical expressions for the corresponding parameters in the user profile of successful logins to determine whether the valid login request satisfies the match condition.

22. The device of claim 21, wherein the one or more parameters comprise at least one of a computer logged into by the user, a time of day when the user accesses the network, a subnet where the user accesses the network, a network access point where the user accesses the network, and a set of services which the user accesses.

23. The device of claim 21, wherein the user profile of successful logins is configurable by the user or a network administrator.

24. The device of claim 21, wherein the profiling engine is further configured to determine the one or more parameters of typical login conditions by using statistical significance tests such that the one or more parameters are indicative of whether a particular login request is from a legitimate user.

25. The device of claim 17, further comprising:

a profiling engine executing on the one or more processors and configured to process the history of successful network logins to generate a location profile of successful logins associated with a location of the network, wherein the location profile of successful logins comprises a statistical expression for one or more parameters of typical login conditions for a location based upon logins for the location contained in the history of successful network logins, wherein the decision engine analyzes the history of successful network logins at least in part by comparing one or more characteristics of the valid login request to one or more statistical expressions for the corresponding parameters in the location profile of successful logins to determine whether the valid login request satisfies the match condition.

26. The device of claim 25, wherein the location profile comprises an enterprise profile associated with the network.

27. The device of claim 17, wherein the decision engine is further configured to analyze the history of successful network logins to determine whether the valid login request satisfies the match condition at least in part by:

generating a probabilistic model based in part on the history of successful network logins;

calculating, based on the probabilistic model, a posterior probability that the valid login request is from a legitimate user given one or more characteristics of the valid login request; and determining that the valid login request satisfies the match condition when the posterior probability that the valid login request is from a legitimate user is above a threshold.

28. The device of claim 27, wherein the probabilistic model is a Bayesian network comprising a plurality of nodes and a plurality of arcs, wherein each node represents a parameter of interest, and wherein each arc interconnects two different nodes within the Bayesian network and represents a causal relationship between two parameters of interest represented by the two different nodes.

29. The device of claim 17, wherein the device further comprises:

a profiling engine executing on the one or more processors and configured to process a history of unsuccessful logins to generate an attack profile of the network password attack, wherein the attack profile comprises one or more statistical expressions for one or more parameters of typical login behavior associated with the network password attack, wherein the decision engine is further configured to compare one or more characteristics of the valid login request to the one or more statistical expressions for the one or more parameters in the attack profile to determine whether the valid login request satisfies the match condition.

30. The device of claim 29, wherein the decision engine is further configured to:

generate a probabilistic model based on the history of successful network logins and the attack profile;

calculate, based on the probabilistic model, a posterior probability that the valid login request is from a legitimate user given one or more characteristics of the valid login request and one or more characteristics of the attack; and determine that the valid login request satisfies the match condition when the posterior probability that the valid login request is from a legitimate user is above a threshold.

31. The device of claim 29, wherein the attack profile includes a parameter indicating the intensity of the attack.

32. The device of claim 17, further comprising:
a profiling engine executing on the one or more processors and configured to generate a normal profile of network logins based on the history of successful network logins, wherein the normal profile of network logins comprises login requests that occur when a network password attack is not occurring.

33. A system, comprising:
an endpoint device associated with a user and with which the user interacts to access a network;
a network access controller coupled to the network, the network access controller comprising:
one or more processors for execution of software instructions;
a login capture module executing on the one or more processors, the login capture module configured to generate a history of successful network logins;
an attack detection module executing on the one or more processors, the attack detection module configured to detect symptoms of a network password attack and to activate a lockout in response to detecting the symptoms of the network password attack;
an access control module executing on the one or more processors, the access control module configured to receive a valid login request from a user while the lockout is activated, wherein the valid login request comprises a valid username and a valid password corresponding to the valid username; and
a decision engine executing on the one or more processors, the decision engine configured to, while the lockout is activated, analyze the history of successful network logins to determine whether the valid login request satisfies a match condition,
wherein the access control module is further configured to, while the lockout is activated, grant the user access to the network when the valid login request satisfies the match condition and deny the user access to the network when the valid login request does not satisfy the match condition even though the valid login request contains a valid username and a valid password.

34. The system of claim 33, wherein the decision engine is further configured to analyze the history of successful network logins to determine whether the valid login request satisfies the match condition at least in part by:
comparing one or more characteristics of the valid login request to one or more corresponding characteristics in a login entry of the history of successful network logins; and
determining that the valid login request satisfies the match condition when the one or more characteristics of the valid login request match the one or more corresponding characteristics in the login entry of the history of successful network logins.

35. The system of claim 33, wherein the decision engine is further configured to analyze the history of successful network logins to determine whether the valid login request satisfies the match condition at least in part by:
comparing one or more characteristics of the valid login request to one or more corresponding characteristics in a plurality of login entries in the history of successful network logins; and
determining that the valid login request satisfies the match condition when the one or more characteristics of the valid login request match the one or more corresponding characteristics in at least a threshold number of valid login entries in the history of successful network logins, wherein the threshold number is at least two valid login entries in the history of successful network logins.

36. The system of claim 33, wherein the history of successful network logins user comprises at least one of username information, location information, subnet information, time information, network access point information, and accessed service information for a plurality of login requests.

37. The system of claim 33, wherein the network access controller further comprises:
a profiling engine executing on the one or more processors and configured to process the history of successful network logins to generate a user profile of successful logins associated with the user, wherein the user profile of successful logins comprises a statistical expression for one or more parameters of typical login conditions for the user based upon logins for the user contained in the history of successful network logins, wherein the decision engine analyzes the history of successful network logins at least in part by comparing one or more characteristics of the valid login request to one or more statistical expressions for the corresponding parameters in the user profile of successful logins to determine whether the valid login request satisfies the match condition.

38. The system of claim 37, wherein the one or more parameters comprise at least one of a computer logged into by the user, a time of day when the user accesses the network, a subnet where the user accesses the network, a network access point where the user accesses the network, and a set of services which the user accesses.

39. The system of claim 37, wherein the user profile of successful logins is configurable by the user or a network administrator.

40. The system of claim 37, wherein the profiling engine is further configured to determine the one or more parameters of typical login conditions by using statistical significance tests such that the one or more parameters are indicative of whether a particular login request is from a legitimate user.

41. The system of claim 33, wherein the network access controller further comprises:
a profiling engine executing on the one or more processors and configured to process the history of successful network logins to generate a location profile of successful logins associated with a location of the network, wherein the location profile of successful logins comprises a statistical expression for one or more parameters of typical login conditions for a location based upon logins for the location contained in the history of successful network logins, wherein the decision engine analyzes the history of successful network logins at least in part by comparing one or more characteristics of the valid login request to one or more statistical expressions for the corresponding parameters in the location profile of successful logins to determine whether the valid login request satisfies the match condition.

42. The system of claim 41, wherein the location profile comprises an enterprise profile associated with the network.

43. The system of claim 33, wherein the decision engine is further configured to analyze the history of successful network logins to determine whether the valid login request satisfies the match condition at least in part by:

generating a probabilistic model based in part on the history of successful network logins;

calculating, based on the probabilistic model, a posterior probability that the valid login request is from a legitimate user given one or more characteristics of the valid login request; and determining that the valid login request satisfies the match condition when the posterior probability that the valid login request is from a legitimate user is above a threshold.

44. The system of claim 43, wherein the probabilistic model is a Bayesian network comprising a plurality of nodes and a plurality of arcs, wherein each node represents a parameter of interest, and wherein each arc interconnects two different nodes within the Bayesian network and represents a causal relationship between two parameters of interest represented by the two different nodes.

45. The system of claim 33, wherein the network access controller further comprises:

a profiling engine executing on the one or more processors and configured to process a history of unsuccessful logins to generate an attack profile of the network password attack, wherein the attack profile comprises one or more statistical expression for one or more parameters of typical login behavior associated with the network password attack, wherein the decision engine is further configured to compare one or more characteristics of the valid login request to one or more statistical expressions for the one or more parameters in the attack profile to determine whether the valid login request satisfies the match condition.

46. The system of claim 45, wherein the decision engine is further configured to:

generate a probabilistic model based on the history of successful network logins and the attack profile;

calculate, based on the probabilistic model, a posterior probability that the valid login request is from a legitimate user given one or more characteristics of the valid login request and one or more characteristics of the attack; and determine that the valid login request satisfies the match condition when the posterior probability that the valid login request is from a legitimate user is above a threshold.

47. The system of claim 45, wherein the attack profile includes a parameter indicating the intensity of the attack.

48. The system of claim 33, further comprising:

a profiling engine executing on the one or more processors and configured to generate a normal profile of network logins based on the history of successful network logins, wherein the normal profile of network logins comprises login requests that occur when a network password attack is not occurring.

49. A non-transitory computer-readable medium comprising instructions for causing a programmable processor to:

generate a history of successful network logins;

detect symptoms of a network password attack;

activate a lockout in response to detecting the symptoms of the network password attack;

receive a valid login request from a user while the lockout is activated, wherein the valid login request comprises a valid username and a valid password corresponding to the valid username;

while the lockout is activated, analyze the history of successful network logins to determine whether the valid login request satisfies a match condition, grant the user access to the network when the valid login request satisfies the match condition, and deny the user access to the network when the valid login request does not satisfy the match condition even though the valid login request contains a valid username and a valid password.

50. A method comprising:

generating a history of successful logins;

detecting symptoms of a password attack;

activating a lockout in response to detecting the symptoms of the password attack;

receiving a valid login request from a user while the lockout is activated, wherein the valid login request comprises a valid username and a valid password corresponding to the valid username;

while the lockout is activated, analyzing the history of successful logins to determine whether the valid login request satisfies a match condition;

while the lockout is activated, granting the user access to a computing resource when the valid login request satisfies the match condition; and while the lockout is activated, denying the user access to the computing resource when the valid login request does not satisfy the match condition even though the valid login request contains a valid username and a valid password.

* * * * *